April 6, 1948.  C. D. LAIDLEY  2,439,306
GASKET
Filed Oct. 2, 1944
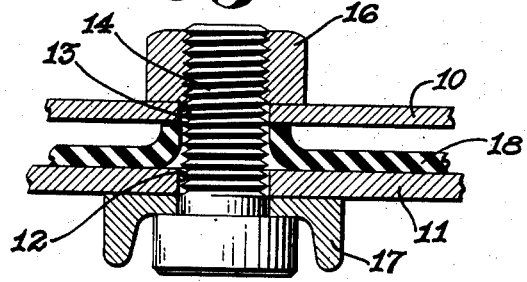
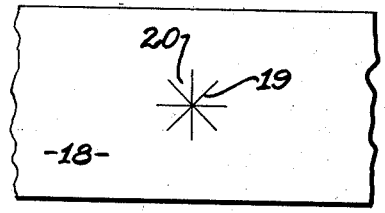 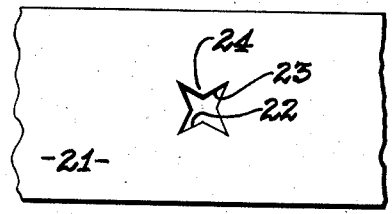
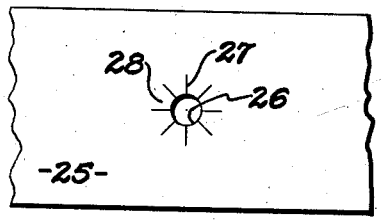 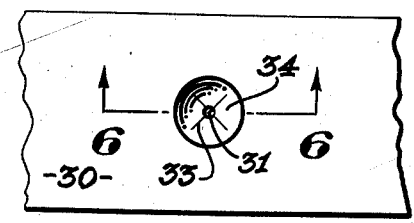
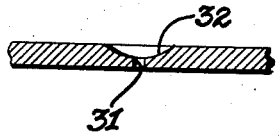
CLARENCE D. LAIDLEY,
INVENTOR.
BY
Hazard and Miller
ATTORNEYS Patented Apr. 6, 1948

2,439,306

UNITED STATES PATENT OFFICE 2,439,306

GASKET

Clarence D. Laidley, Los Angeles, Calif.

Application October 2, 1944, Serial No. 556,711

1 Claim. (Cl. 288—20)

1

This invention relates to improvements in gaskets, and particularly to that type of gasket used in bolted tanks and the like.

In the conventional construction of bolted tanks the overlapped edges of the tank sheets have registering holes spaced from each other on approximately 2" centers designed to receive the bolts. Usually a shallow channel iron is positioned against one side of the lapped sheets and the bolts are inserted through the channel iron through the registering holes and have nuts applied to the opposite sides. Prior to the attachment of adjoining sheets the channel, bolts and gasket are installed. Heretofore such gaskets have been in the form of strips of rubber or rubber-like material, such as synthetic rubber, having undersized holes punched therein to permit of the insertion of the bolts therethrough. Generally speaking, the bolts used are ⅜" and ½" in diameter and where ⅜" bolts are to be employed the holes through the gasket strip may be only ¼" in diameter. Where the bolts to be employed are ½" bolts the holes through the gasket strip are approximately ⅜" in diameter. With gasket strip thus constructed when bolts are tightened the material of the gasket immediately surrounding the bolts is subject to very high compression. This high compression causes the gasket to creep or flow radially away from the area immediately around the bolts to areas of less compression such as the space between the bolts and outward from between the lapped sheets. This flow of the rubber or rubber-like material from the area immediately surrounding the bolt is apt to result in leakage in that the liquids contained in the tank may follow the bolt threads and leak between the threads of the bolt and the material of the gasket.

If the holes in the gasket are made much smaller so that they will have a greater undersize with relation to the bolts they interfere with the insertion of the bolts therethrough and when the bolts are forced through the gasket, the gasket is apt to tear resulting in leakage. In some forms of construction the gasket is reenforced by having incorporated therein a reenforcing fabric intended to resist tearing. However, such fabric has sometimes been criticized in that it functions as a wick and thus induces leakage.

It is highly desirable to have a gasket which is so constructed that bolts may be readily passed therethrough but which will provide an excess of rubber immediately around the bolt so that when this excess of rubber is subjected to the high compression occasioned by the tightening of the bolts that all the rubber will not flow away from the sides of the bolts but sufficient will remain in this locality and be compressed against the sides of the bolts and the threads thereon.

An object of the invention is to provide an im-

2 proved gasket for bolted tanks and the like which is so constructed as to permit of the easy insertion of bolts therethrough, and which will provide an adequate amount of rubber in the immediate neighborhood of the bolts which will not flow away when subjected to compression, but will remain in this locality to be pressed firmly into engagement with the bolts, suitable provision being made to prevent or retard any tendency of the gasket to flow.

Another object of the invention is to provide an improved gasket for bolted tanks and the like consisting of a strip of rubber or rubber-like material having spaced localities where the bolts may be inserted through the gasket, such localities having slits extending inwardly from a circumference approximately equal to that of the bolt defining a plurality of mutually independent inwardly extending fingers that are readily bendable to enable the insertion of the bolt, these fingers becoming lodged or wedged at their inner ends between the threads on the bolts and the walls of the holes in the lapped sheets so that they will tend to be mechanically held in position around the bolts to resist flowing of the material outwardly when the bolts are tightened and the gasket thus subjected to high compression.

With the foregoing and other objects in view, which will be made manifest in the following detailed description and specifically pointed out in the appended claim, reference is had to the accompanying drawings for an illustrative embodiment of the invention, wherein:

Figure 1 is a sectional view through a typical seam of a bolted tank, illustrating a gasket embodying one form of the present invention as having been installed therein, the bolt being indicated in a position just prior to tightening;

Fig. 2 is a partial view in elevation of a section of one form of gasket embodying the present invention;

Figs. 3, 4, and 5 are similar views illustrating alternative forms of construction of gasket embodying the present invention; and Fig. 6 is a sectional view taken substantially upon the line 6—6 upon Fig. 5.

Referring to the accompanying drawings wherein similar reference characters designate similar parts throughout, 10 and 11 indicate two sheets of a bolted tank having lapped edge portions in which there are registrable holes 12 and 13 designed to receive bolts 14 on which are applicable nuts 16. In conformity with general practice a channel iron 17 is positioned between the head of the bolts 14 and the sheet 11. One form of gasket embodying the present invention is as illustrated in Fig. 2, consisting of a strip 18 of suitable width and of a length adequate to extend the entire length of the seam in which there are spaced localities providing for the insertion of the bolts 14 therethrough. Only one of these localities is illustrated in Fig. 2, which consists merely of a series of pre-formed radial slits 19 extending inwardly from a circumference approximately equal to that of the bolt defining a plurality of mutually independent fingers 20 extending inwardly. When the gasket of this type is positioned between the sheets 10 and 11 these fingers 20 which are readily bendable permit of the easy insertion of the bolts 14 therethrough. These fingers tend to bend outwardly sympathetically with the movement of the bolt and their inner ends become lodged or wedged between the threads of the bolt and the walls of the holes in sheet 10. In this form of construction, inasmuch as no portion of the strip 18 is removed at these localities there is an excess of rubber or rubber-like material in an area immediately surrounding the bolt and between the nut and bolt head. When the bolt is tightened the inner ends of the fingers which are lodged between the bolt and the ends of the hole tend to retain the rubber in this locality so that it will not be spread out from the immediate neighborhood of the bolt in a radial direction when subjected to a high compression. When this excess of rubber is thus compressed, it then tends to remain immediately surrounding the bolt and will be crowded inwardly into firm engagement with the threads thus affording a leakproof joint around the bolt.

In some instances, the nature of the rubber or rubber-like material or its thickness is such that it may be desirable to reduce the amount of this excess of rubber immediately surrounding the bolt. In such instances, the gasket may be constructed as illustrated in Fig. 3, wherein it consists merely of a strip of rubber or rubber-like material 21 with spaced openings 22 formed therein somewhat in the nature of star-shaped openings. These openings are formed by cutting or punching out portions of the rubber strip in the form of widened slits 23 defining relatively shallow fingers 24. The slits 23 have their outer ends around on a circumference approximately equal to that of the bolt and the bases of the fingers 24 are likewise arranged approximately on a circumference equal to that of the bolt. In using this form of construction the bolt may be readily inserted through the openings as the fingers 24 are readily bendable and an excess of rubber is retained in the immediate neighborhood of the bolt for the purposes as above described. In this form of construction the excess of rubber present is not as great as that present in the construction as illustrated in Fig. 2, but is nevertheless adequate to form a leakproof seal around the bolt.

Fig. 4 illustrates another form of construction wherein the strip 25 has a materially undersized aperture 26 punched therein. Thus the diameter of this aperture may be one-half the diameter of the bolt or even smaller. Extending outwardly therefrom are pre-formed radial slits 27 defining fingers 28. These slits terminate on a circumference approximately that of the bolt. In this form of construction the bolts may be readily inserted through the gasket and the fingers 28 bent laterally. In this form of construction also there is not quite the excess of rubber present around the bolt as in the case of Fig. 2. By increasing or decreasing the size of aperture 26 the amount of excess rubber around the bolt may be regulated.

In Figs. 5 and 6 still a further alternative form of construction is disclosed. In this form of construction there is a strip 30 formed of rubber or rubber-like material in which there are extremely small apertures 31. Surrounding these apertures the thickness of the gasket may be considerably reduced, the reduction in thickness being apparent in the form of concavities 32 surrounding the apertures. Radial slits 33 may extend outwardly from the apertures 32 defining fingers 34 which, because of their reduced thickness, are extremely flexible. These thinned fingers may be employed in situations where the clearance between the bolt hole and the bolt is quite small. In some instances it is possible to omit the radial slits 33 in this form of construction entirely in which case the bolt may be forced through the gasket and the thinned material around the apertures 31 will have sufficient stretch to enable the bolt to be passed therethrough with the material of the gasket stretching about it. In this form of construction the amount of excess rubber left in close proximity to the bolt can be regulated by increasing or decreasing the size of the apertures 31 or the depth of the concavities 32.

From the above-described constructions it will be appreciated that an improved gasket for bolted tanks and the like is provided which enables the bolts to be readily extended therethrough. An adequate amount of the gasket material is left in close proximity to the bolt so that when the bolt is tightened the gasket material will not be crowded or caused to flow away from it. Inasmuch as the slits are pre-formed in the gasket material and the fingers defined thereby are quite flexible and readily bendable danger of the gasket splitting due to forcing a bolt through an undersized aperture is eliminated. While reenforcing fabric may be incorporated in the rubber of the gasket strip, such reenforcing fabric is unnecessary and is usually left out to avoid wick action.

Various changes may be made in the details of construction without departing from the spirit and scope of the invention as defined by the appended claim.

I claim:

A gasket for bolted tanks and the like comprising a strip of rubber or rubber-like material having spaced openings therein adapted to receive bolts, said openings being materially smaller in diameter than the diameter of the bolts and having pre-formed slits extending outwardly therefrom defining a plurality of mutually independent fingers, the thickness of the rubber being decreased in the area surrounding said openings.

CLARENCE D. LAIDLEY.

REFERENCES CITED

The following references are of record in the file of this patent:

UNITED STATES PATENTS

| Number | Name | Date |
|---|---|---|
| 1,868,794 | Fuller et al. | July 26, 1932 |
| 1,889,144 | Hubbard et al. | Nov. 29, 1932 |
| 2,019,031 | Waples | Oct. 29, 1935 |

FOREIGN PATENTS

| Number | Country | Date |
|---|---|---|
| 431,097 | Great Britain | 1935 |